(12) United States Patent
Shomura

(10) Patent No.: US 6,170,465 B1
(45) Date of Patent: Jan. 9, 2001

(54) ENGINE DRIVING CONTROL APPARATUS AND METHOD

(75) Inventor: Nobuyuki Shomura, Hamamatsu (JP)

(73) Assignee: Suzuki Kabushiki Kaisha, Hamamatsu (JP)

( * ) Notice: Under 35 U.S.C. 154(b), the term of this patent shall be extended for 0 days.

(21) Appl. No.: 09/241,095

(22) Filed: Feb. 1, 1999

(30) Foreign Application Priority Data

Feb. 2, 1998 (JP) .................................................. 10-021238

(51) Int. Cl.$^7$ ...................................................... F02M 7/00
(52) U.S. Cl. .......................................................... 123/436
(58) Field of Search ................................ 123/436, 406.24

(56) References Cited

U.S. PATENT DOCUMENTS

| | | | |
|---|---|---|---|
| 5,447,137 | * | 9/1995 | Asano et al. .......................... 123/436 |
| 5,515,828 | * | 5/1996 | Cook et al. ............................ 123/436 |
| 5,529,041 | * | 6/1996 | Andrews ................................ 123/436 |
| 5,581,022 | * | 12/1996 | Sprague et al. ....................... 123/436 |
| 5,704,336 | * | 1/1998 | Wrobel .................................. 123/436 |
| 5,775,298 | * | 7/1998 | Haller .................................... 123/436 |
| 5,806,014 | * | 9/1998 | Remboski et al. ................ 123/406.24 |
| 5,824,890 | * | 10/1998 | La Palm et al. ...................... 123/436 |
| 5,828,976 | * | 10/1998 | Fukuchi et al. ...................... 123/436 |

\* cited by examiner

Primary Examiner—John Kwon
(74) Attorney, Agent, or Firm—Finnegan, Henderson, Farabow, Garrett & Dunner, L.L.P

(57) ABSTRACT

An engine generally performs compression, explosion, exhausting and scavenging strokes sequentially, and includes an engine driving control apparatus including a detector for detecting a position of an explosion stroke, a detector for detecting instantaneous rotation speed of the crankshaft, and a control unit which receives input from the explosion stroke position detector and the rotation speed detector. The control unit performs the steps of judging a combustion state from an increasing rate of a rotation speed of the crankshaft in each explosion stroke, intentionally increasing or reducing an amount of fuel injection, calculating variation in said combustion state and correcting said amount of fuel injection so as to enhance the combustion state.

4 Claims, 12 Drawing Sheets

| | | CRANKSHAFT ROTATION SPEED | | | | |
|---|---|---|---|---|---|---|
| | | N1 | N2 | N3 | ... | Nn |
| THROTTLE OPENING DEGREE (INTAKE SYSTEM PRESSURE) | $\theta 1(P1)$ | A11 | A12 | A13 | ... | A1n |
| | $\theta 2(P2)$ | A21 | A22 | A23 | ... | A2n |
| | $\theta 3(P3)$ | A31 | A32 | A33 | ... | A3n |
| | : | : | : | : | | : |
| | $\theta 3(P3)$ | An1 | An2 | An3 | ... | Ann |

FIG. 13

| X | 1 | 2 | 2 | ... | N OR GREATER |
|---|---|---|---|---|---|
| a | 0.9a | 0.8a | 0.7a | ... | 0.2a |
| b | 0.9b | 0.8b | 0.7b | ... | 0.2b |

FIG. 14

ENGINE DRIVING CONTROL APPARATUS AND METHOD

BACKGROUND OF THE INVENTION

Field of the Invention

The present invention relates to a driving control apparatus of an engine and a method therefor, which enables fuel injection amount to set to an optimal value and makes it possible to precisely control the fuel injection even in any type of cylinders.

Prior Art

In recent years, a fuel injection type engine mounted in a vehicle, a ship or the like is provided with a driving control apparatus for precisely controlling an amount of fuel injection. In a conventional driving control apparatus, the fuel injection amount is controlled in a manner such that an air/fuel ratio, i.e., a ratio of air to fuel to be supplied to the engine becomes an optimal value.

For example, there is a known driving control apparatus in which data such as throttle opening degree and engine revolution speed, and data from detection means such as $O_2$ sensor or the like mounted in an exhaust passage of the engine are input to control means (such as a computer), an intake air amount and the air/fuel ratio are calculated by this control means, and a feed-back control is conduced for correcting the fuel injection amount based on the calculated value.

According to such a driving control apparatus, since it is possible to always set an air/fuel ratio close to a theoretical air/fuel ratio, combustion efficiency is extremely enhanced, and the engine output is then enhanced. Further, since the injection amount of fuel can be suppressed to the necessary but minimum amount, this can contribute to reduction of the fuel consumption amount.

However, since the air/fuel ratio detecting means such as the $O_2$ sensor can detect only a value close to the theoretical air/furl ratio, the conventional driving control apparatus is preferable for a four-stroke-cycle engine in which four strokes, i.e., an intake stroke, a compression stroke, an explosion stroke and an exhaust stroke are substantially clearly distinguished, but is not preferable for a two-stroke-cycle engine. That is, in the case of the two-stroke-cycle engine, the above mentioned four strokes are overlapped, and especially in a scavenging stroke in which intake and exhaust are carried out simultaneously, there is generated a blow-through phenomenon in which intake mixture is discharged from an exhaust port as it is, and it is difficult to precisely detect the air/fuel ratio.

Further, in the case of an engine mounted in an outboard motor, its exhaust passage is formed extremely short irrespective of two-stroke-cycle engine or four-stroke-cycle engine, and the last exhaust port is opened into the water and thus, the water (salt water) enters in the exhaust passage. Therefore, the detection means such as $O_2$ sensor mounted in this portion is severely required to have heat-resistance, vibration-resistance, water-resistance, rust-resistance and the like, which is very expensive, is prone to be out of order and lacks reliability.

Further, as described above, since the last exhaust port of the engine of the outboard motor is opened into the water, a back pressure in the exhaust passage is largely varied in accordance with the sailing condition. Such a variation in a back pressure in the exhaust passage varies the intake air amount especially in a two-stroke-cycle engine. Therefore, even if the intake air amount is calculated from the throttle opening degree or the engine revolution speed, such a calculated value may be different from an actual value in many cases and for this reason also, it is difficult to precisely control the fuel injection.

Furthermore, in the case of a multi-cylinder engine of an outboard motor, since the length of the exhaust passage of each of the cylinders is different, the exhaust back pressure is also different, and a difference in the intake air amount in each of the cylinders is generated. Therefore, it is more difficult to precisely set the fuel injection amount.

SUMMARY OF THE INVENTION

The present invention has been accomplished to solve the problems and drawbacks encountered in the prior art mentioned above, and an object of the present invention is to provide a driving control apparatus of an engine capable of setting the fuel injection amount to the optimal value with a simple and low-priced structure in any of the two-stroke-cycle engine and four-stroke-cycle engine.

Another object of the present invention is to provide a driving control apparatus of an engine, which makes it possible to precisely control the fuel injection even in the multi-cylinder engine.

A further object of the present invention is to provide a driving control apparatus of an engine allowing a user to easily notice a trouble at an early stage when the engine broken down so that the engine is prevented from being used as it is and that the broken portion can be easily detected and repaired.

A still further object of the present invention is to provide a driving control apparatus of an engine, which makes it possible to indicate a driving state of the engine without providing specific indicating means, and to simplify a structure of the driving control apparatus.

A still further object of the present invention is to provide a driving control method of an engine capable of performing an improved engine operation by using the engine driving control apparatus mentioned above.

These and other objects can be achieved according to the present invention by providing, in one aspect, a driving control apparatus of an engine which generally comprises a cylinder head, a cylinder block, a cylinder assembly including a plurality of cylinders, a crank case including a crankshaft, an ignition member and a surge tank, which are operatively connected to each other, the cylinders carrying out compression, explosion, exhausting and scavenging strokes sequentially, the driving control apparatus comprising:

a detector means for detecting a position of an explosion stroke;

a detector means for detecting instantaneous rotation speed of the crankshaft; and a control unit which receives input from the explosion stroke position detecting means and the rotation speed detecting means, the control unit including an element for judging a combustion state from an increasing rate of a rotation speed of the crankshaft in each explosion stroke, an element for intentionally increasing or reducing an amount of fuel injection and calculating variation in the combustion state and an element for correcting the amount of fuel injection so as to enhance the combustion state.

In a preferred embodiment, the control unit is programmed such that the judgement of the combustion state is made individually for each of the cylinders or is programmed such that abnormalities are indicated when at least one of the judged combustion state and an average value thereof is a numerical value indicative of abnormal combustion.

In another aspect, there is provided a driving control apparatus of an engine generally including a cylinder block into which a plurality of cylinders are disposed and a crank case is provided with a crankshaft, the cylinders carrying out compression, explosion, exhausting and scavenging strokes sequentially, the driving control apparatus comprising:

a detector means for detecting a driving state of the engine; and a unit for converting various detection values detected by the driving state detecting means and various control values concerning the driving state of the engine into frequency and indicating the frequency to a meter or the like.

In a further aspect, there is provided a driving control method of an engine which generally includes a cylinder block into which a plurality of cylinders are disposed and a crank case provided with a crankshaft, the cylinders carrying out compression, explosion, exhausting and scavenging strokes sequentially, the driving control method comprising the steps of:

detecting a position of an explosion stroke of the cylinder;

detecting instantaneous rotation speed of the crankshaft; and performing a control process in accordance with the explosion stroke position detection and the rotation speed detection, the control process including steps of judging a combustion state from an increasing rate of a rotation speed of the crankshaft in each explosion stroke, intentionally increasing or reducing an amount of fuel injection, calculating variation in the combustion state and correcting the amount of fuel injection so as to enhance the combustion state.

According to the characteristic features of the present invention mentioned above, it is possible to clearly judge the combustion state in each of the explosion strokes of the engine and to correct the fuel injection amount from the combustion state only by using the meter or the like conventionally mounted in the engine for judging the cylinder condition or for detecting the rotation speed of a crankshaft as the explosion stroke position detecting means and as the rotation speed detecting means and by additionally setting a program of the control means.

Therefore, it is unnecessary to detect the actual air/fuel ratio of the mixture and it is also unnecessary to add the expensive and unreliable $O_2$ sensor for detecting the air/fuel ratio and other mechanical elements. It becomes hence possible to set the fuel injection amount to the optimal value with a simple and low-priced structure.

Further, the fuel injection amount is corrected by detecting the combustion state only from the variation in rotation speed of the crankshaft in each of the explosion strokes, and it is unnecessary to detect the actual air/fuel ratio. Therefore, it is possible to precisely control the fuel injection not only for the four-stroke-cycle engine, but also for the two-stroke-cycle engine in which it is difficult to detect the air/fuel ratio due to the blow-through phenomenon.

Furthermore, the combustion state can be judged individually for each of the cylinders even in the multi-cylinder engine, the fuel injection can be controlled more precisely.

Still furthermore, even if the engine should be broken down, if the user recognizes the indication of abnormal state, he or she can easily notice the state of the engine at an early stage, and the engine is prevented from being used as it is. Thus, the broken portion can be easily detected and repaired.

Furthermore, it is possible to indicate the driving state of the engine on a meter or the like which is conventionally provided without providing specific indicating means and therefore, the structure of the driving control apparatus can be made simplified.

The nature and further characteristic features of the present invention will be made more clear from the following descriptions made with reference to the accompanying drawings.

BRIEF DESCRIPTION OF THE DRAWINGS

In the accompanying drawings:

FIG. 13 is a table showing relation among throttle opening degree, crankshaft rotation speed and fuel injection amount correction coefficient; and FIG. 14 is a table showing degree of increase and decrease of the fuel injection amount correction coefficient with respect to the actual rotation of the injection amount correction control.

DESCRIPTION OF THE PREFERRED EMBODIMENTS

An embodiment of the present invention will be explained hereunder by way of an engine of an outboard motor, for example, with reference to the accompanying drawings.

Figure 1:
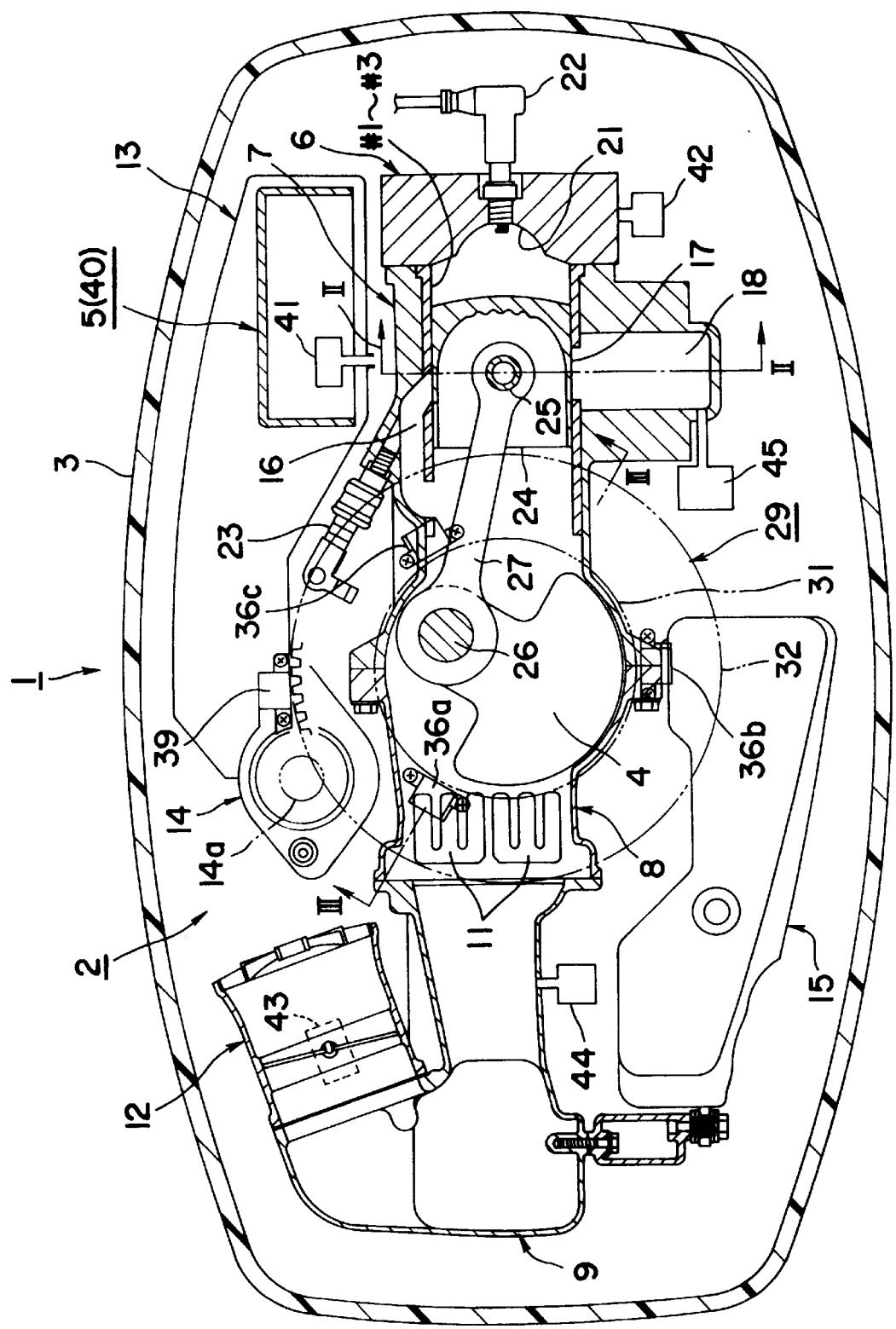
FIG. 1 is a transverse sectional view of an engine portion of an outboard motor.

FIG. 1 is a transverse sectional view of an engine unit of an outboard motor, for example, to which the present invention is applicable, and the left side of FIG. 1 is the advancing direction of a ship. The outboard motor 1 is provided with an engine 2 within an engine cover 3. The engine 2 is, e.g., an in-line water-cooled type three-cylinder two-stroke-cycle engine, and is vertically mounted such that its crankshaft 4 is directed in a vertical direction. The engine 2 includes a driving control apparatus 5 of the present invention.

The engine 2 mainly comprises, in the order of back, a cylinder head 6, a cylinder block 7, a crankcase 8 and a surge tank 9 which are fastened and fixed to one another through bolts (not shown). A connected portion between the crankcase 8 and the surge tank 9 is provided with a lead valve 11, and a throttle body 12 for adjusting an intake air amount is disposed in the surge tank 9 closer to its entrance. An electric equipment case 13 and a starter motor 14 are disposed on the right side of the engine 2 in the advancing direction, and an oil tank 15 is disposed on the left side of the engine 2 in the advancing direction.

Figure 2:
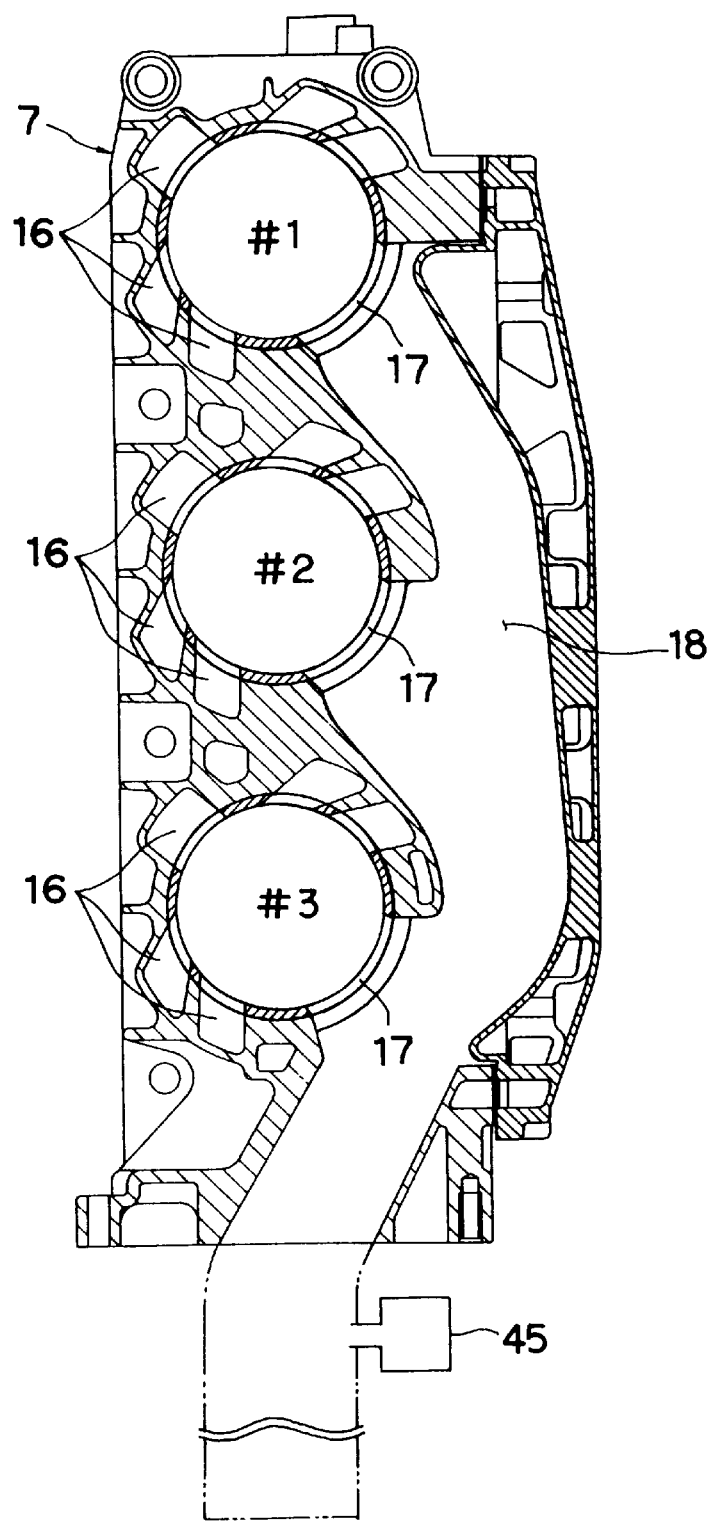
FIG. 2 is a vertical sectional view of a cylinder block taken along the line II—II in FIG. 1.

As shown also in FIG. 2, three cylinders #1 to #3 are formed in the cylinder block 7 in the order from above, five scavenging ports 16 and one exhaust port 17 leading to an interior of the crankcase 8 are formed around each of the cylinders. A vertically extending exhaust passage 18 is formed on one side (e.g., left side in the advancing direction) of the cylinders #1 to #3, and the exhaust port 17 of each of the cylinders #1 to #3 communicates with the exhaust passage 18. That is, the engine 2 is designed such that the cylinders #1 to #3 commonly use the one exhaust passage 18.

Combustion chambers 21 which are respectively aligned with the cylinders #1 to #3 are formed in the cylinder head 6, and a spark plug 22 is disposed in a central portion of each of the combustion chamber 21. An injector (fuel injection device) 23 for injecting fuel is disposed in the scavenging port 16.

A piston 24 is slidably inserted in each of the cylinders #1 to #3, and a piston pin 25 of the piston 24 is connected to a crank pin 26 of the crankshaft 4 through a connecting rod 27. Reciprocating motion of the piston 24 in each of the cylinders #1 to #3 is converted into rotating motion of the crankshaft 4, and this rotation is picked up as output of the engine 2 and is transmitted to a propeller (not shown) of the outboard motor 1.

Figure 3:
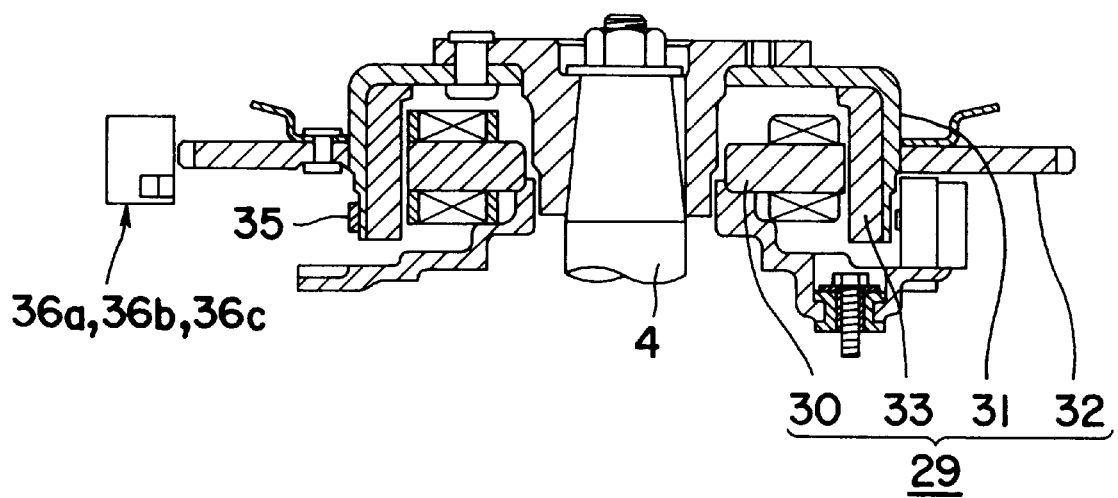
FIG. 3 is a vertical sectional view of a flywheel magnet apparatus taken along the line III—III in FIG. 1.

As shown in FIGS. 1 and 3, a flywheel magnet assembly 29 is disposed on an upper portion of the engine 2. This magnet assembly 29 comprises a stator coil 30 fixed to an upper portion of the cylinder block 7 and the crankcase 8, a bowl-like flywheel 31 provided on an upper end of the crankshaft 4 for rotation together with the crankshaft 4, a ring gear fixed to an outer periphery of the flywheel 31 in a brim-like manner, and a magnet 33 fixed to an inner periphery of the flywheel 31.

The flywheel 31 and the crankshaft 4 rotate together and the magnet 33 rotates around the stator coil 30, thereby generating electricity, which operates or functions as power source of the entire outboard motor 1. When the engine 2 is to be started, a pinion gear 14a (see FIG. 1) of the starter motor 14 meshes with the ring gear 32, and a power of the starter motor 14 is transmitted to the crankshaft 4 to start the engine 2.

Figure 4:
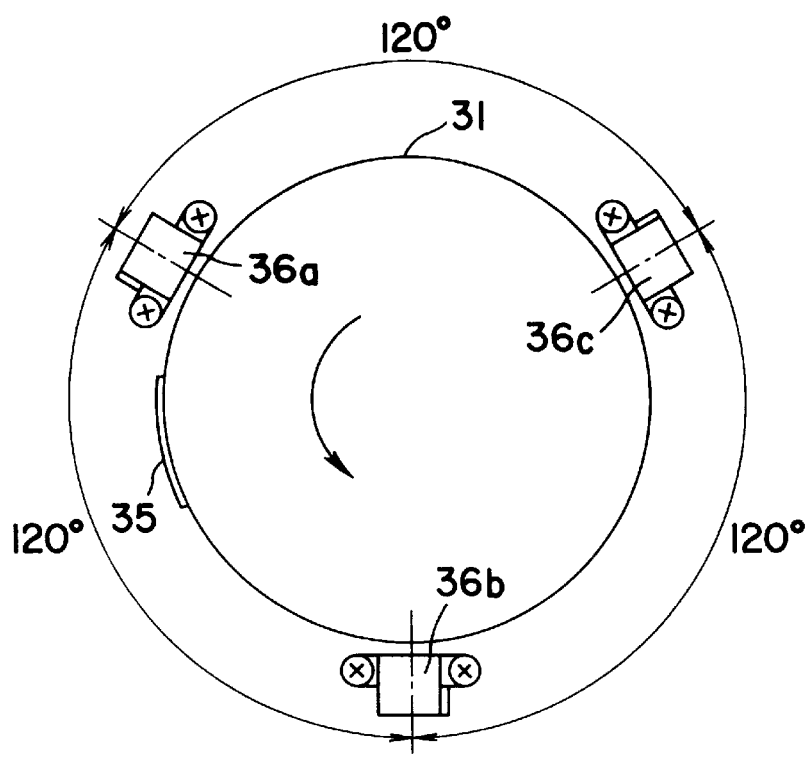
FIG. 4 is a plane view of the flywheel magnet assembly.

As shown in FIGS. 3 and 4, one trigger pole 35 is fixed to an outer peripheral surface of the flywheel 31, and three pulsar coils 36a, 36b and 36c are disposed around the flywheel 31. As shown in FIG. 1, the pulsar coils 36a, 36b and 36c are fixed to upper portions of the cylinder block 7 or the crankcase 8, and they are separated from one another through an angle of 120°. If the flywheel 31 (crankshaft 4) rotates, the trigger pole 35 passes through each of the pulsar coils 36a, 36b and 36c, and whenever the trigger pole 35 passes through them, three kinds of trigger signals A1, A2 and A3 (see FIG. 10) are sent from each of the pulsar coils 36a, 36b and 36c, respectively.

Figure 5:
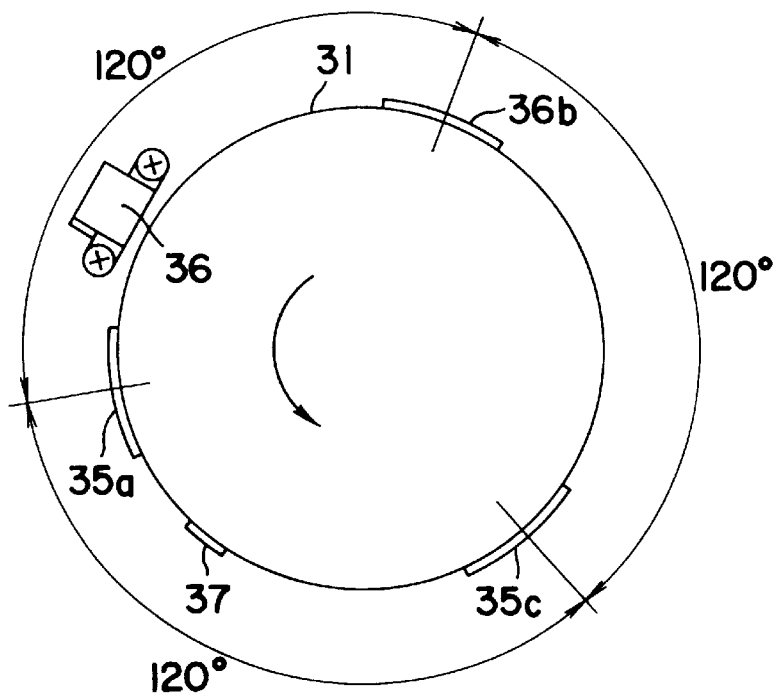
FIG. 5 is a plane view showing another embodiment of the flywheel magnet assembly.

Alternatively, first to third trigger poles 35a, 35b and 35c may be fixed to the outer peripheral surface of the flywheel 31 such as to be separated from one another through an angle of 120°, and one pulsar coil 36 may be disposed around the flywheel 31 as shown in FIG. 5. In this case, it is set such that a marking pole 37 is disposed on side of the first trigger pole 35a for example, and a trigger pole which passes after the marking pole 37 is the first trigger pole 35a, and the first to third trigger poles 35a, 35b and 35c pass and send trigger signals A1, A2 and A3.

Figure 6:
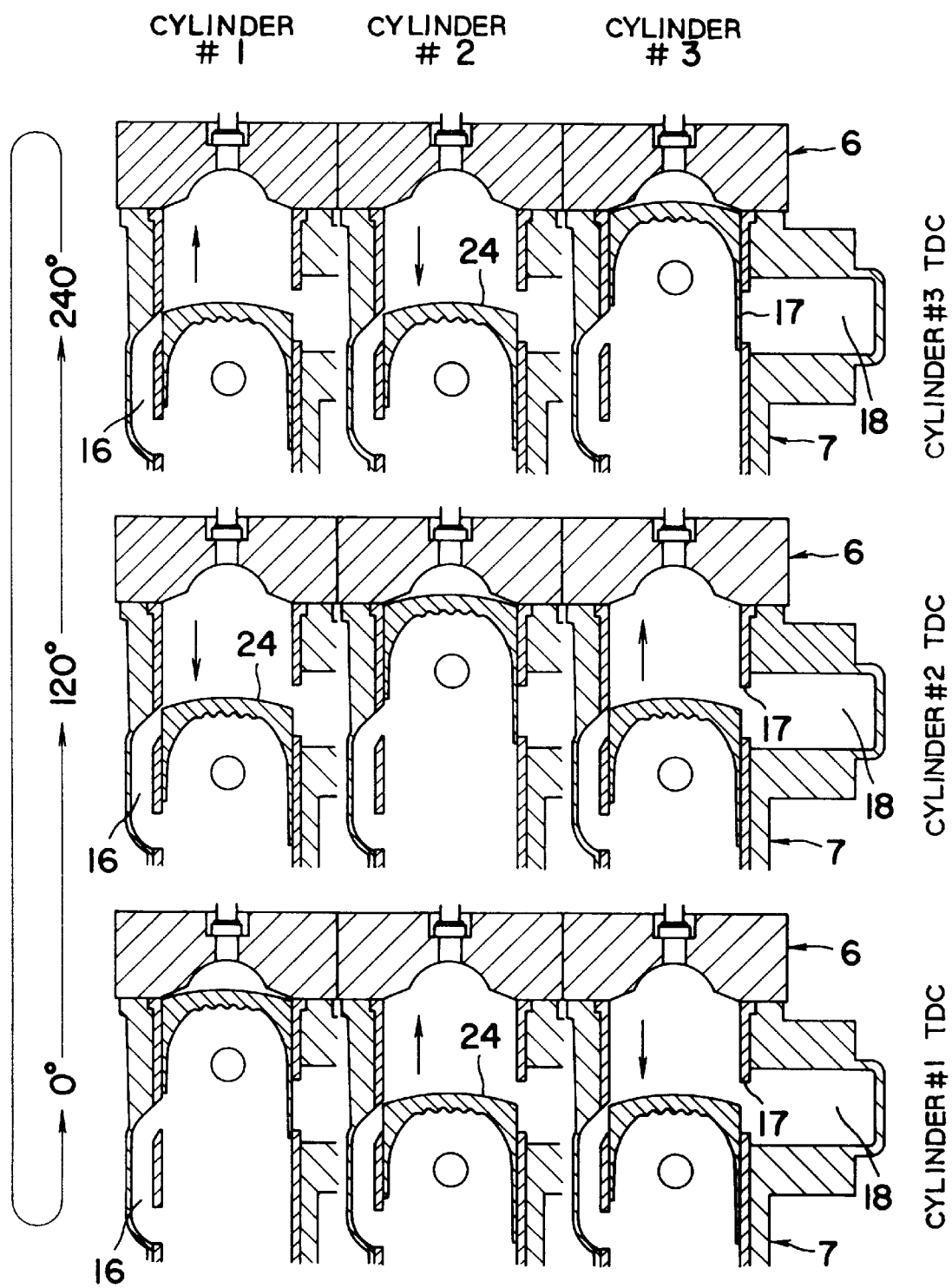
FIG. 6 is a vertical sectional view showing strokes in each the cylinder of the engine.
Figure 7:
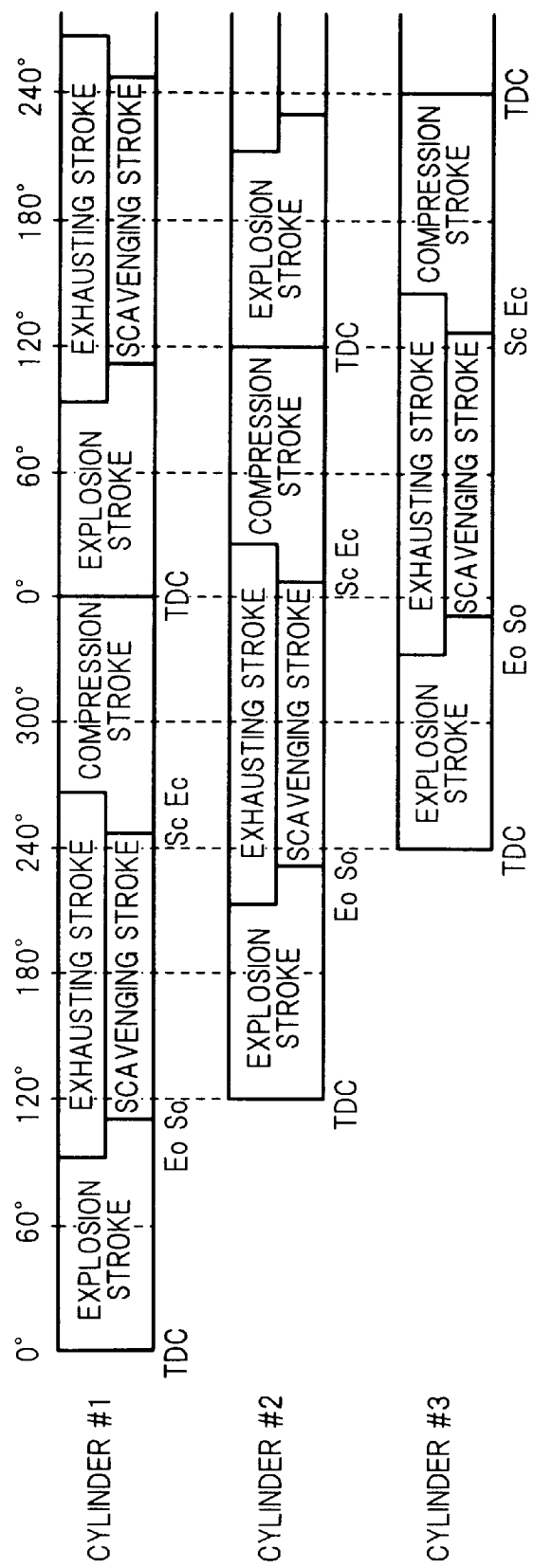
FIG. 7 is a diagram showing stroke cycle of a two-stroke-cycle engine.

As shown in a vertical sectional view of FIG. 6 and a diagram showing stroke cycle of FIG. 7, whenever the crankshaft 4 rotates once, top dead center is established in each of the three cylinders #1 to #3, while keeping a phase difference of 120° among the three cylinders #1 to #3. Thereafter, a cycle of explosion (expansion) stroke, exhaust and scavenging stroke (intake stroke) and compression stroke is repeated. It is set that the trigger signal A1 is sent at the top dead center position of the cylinder #1, the trigger signal A2 is sent at the top dead center position of the cylinder #2 and the trigger signal A3 is sent at the top dead center position of the cylinder #3. Therefore, the trigger pole 35 and the pulsar coils 36a to 36c function as explosion stroke position detecting means (according to the first aspect) for detecting the position of each of the three cylinders #1 to #3.

Further, as shown in FIG. 1, a crank speed sensor 39 is disposed on an upper portion of the starter motor 14 for example. This crank speed sensor 39 is disposed in the vicinity of an outer periphery of the ring gear 32 of the flywheel magnet apparatus 29. The crank speed sensor 39 senses a motion of the ring gear 32 which rotates together with the crankshaft 4, thereby sending a crankshaft rotation speed signal B (see FIG. 10) at every several degrees of angle, and the crank speed sensor 39 functions as rotation speed detecting means for detecting the instantaneous rotation speed of the crankshaft 4.

A two-stroke-cycle engine or a four-cycle engine is conventionally provided with the trigger pole 35 and the pulsar coils 36a to 36c as equipment for judging the strokes of each of the cylinders #1 to #3, and is conventionally provided with the crank speed sensor 39 as equipment for detecting the rotation speed of the crankshaft 4. The trigger signals A1, A2 and A3 as well as the crankshaft rotation speed signal B are used as reference signals for setting the fuel injection amount and the ignition timing.

A control unit 40 is built into the electric equipment case 13. An atmospheric pressure 41 is built into the control unit 40. The cylinder head 6, the throttle body 12, the surge tank 9 and the exhaust passage 18 are respectively provided with a cooling water temperature sensor 42, a throttle opening degree sensor 43, an intake air temperature sensor 44 and an exhaust passage pressure sensor 45.

Figure 8:
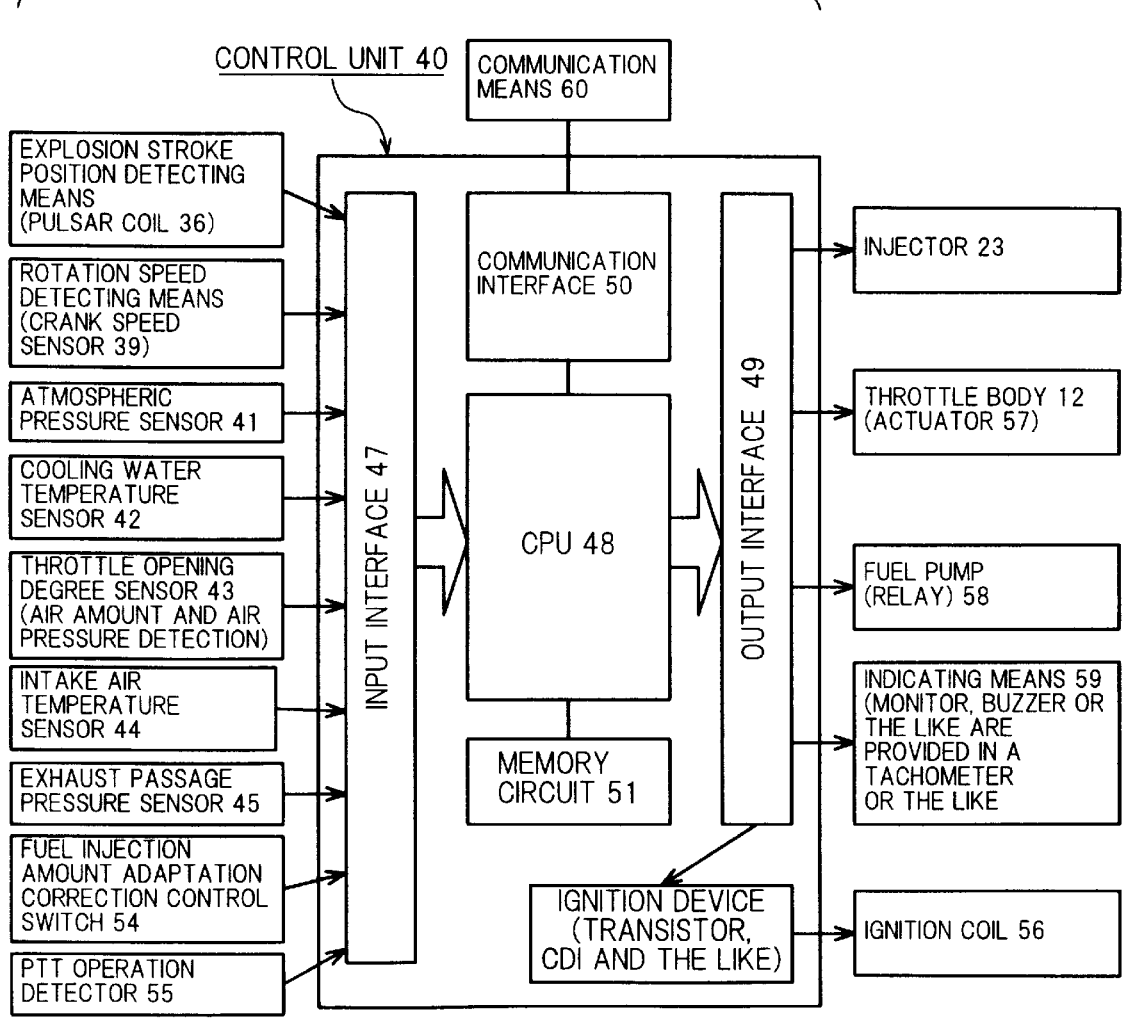
FIG. 8 is a block diagram showing a structure of a driving control apparatus of the present invention.

FIG. 8 is a block diagram showing a structure of the driving control apparatus 5 of the present invention. As shown in FIG. 8, the control unit 40 is an essential portion of the driving control apparatus 5. Devices such as an input interface 47, a central processing unit (CPU) 48, an output interface 49, a communication interface 50, a memory circuit 51 and an ignition device 52 are built in the control unit 40, which are connected to one another.

Devices such as the pulsar coils 36a to 36c as the explosion stroke position detecting means, sensors such as the crank speed sensor 39 as the rotation speed detecting means, the atmospheric pressure 41 the cooling water temperature sensor 42, the throttle opening degree sensor 43, the intake air temperature sensor 44, the exhaust passage pressure sensor 45, a fuel injection amount adaptation correction control switch 54, a PTT (power trim and tilt) operation detector 55 are also elements constituting the driving control apparatus 5, and they are connected to the input interface 47 of the control unit 40.

The PTT operation detector 55 detects the operation of a power trim and tilt apparatus (not shown) mounted in the outboard motor 1. The power trim and tilt apparatus is an apparatus for automatically adjusting a forward-bent posture of the sailing outboard motor 1 by a hydraulic pressure to enhance the propeller efficiency to the utmost.

Further, an ignition coil 56 is connected to the ignition device 52 of the control unit 40. The injector 23, an actuator 57 provided in the throttle body 12 for adjusting the air amount, a fuel pump (relay 58), an indicating means 59 such as a monitor and a buzzer are connected to the output interface 49. Communication means 60 is connected to the communication interface 50.

When the engine 2 is operated, the CPU 48 of the control unit 40 calculates the intake air amount, the fuel injection amount, the ignition timing and the like, based on data representing such as the trigger signals A1, A2, A3, the crankshaft rotation speed, the atmospheric pressure, the engine (cooling water) temperature, the throttle opening degree, the intake air temperature, the exhaust gas pressure and the like, which are all input from the pulsar coils 36a to 36c, the various sensors, and the devices 39, 41 to 45, 54 and 55 through the input interface 47, and outputs the operation signal to the injector 23, the throttle body 12 (actuator 57), the fuel pump (relay 58), the ignition device 52 and the like through the output interface 49, thereby controlling the driving of the engine 2.

Figure 9:
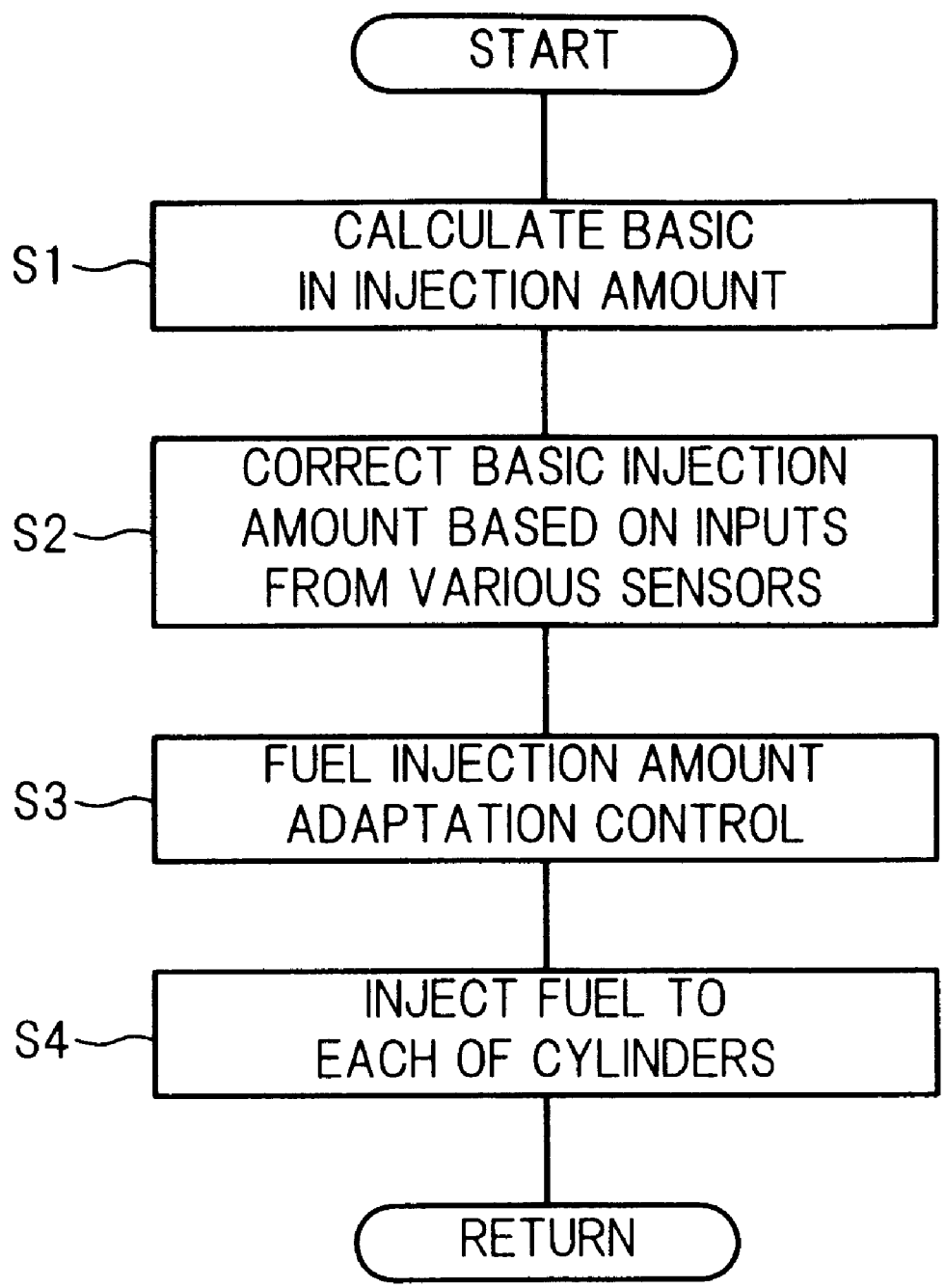
FIG. 9 is a flowchart showing a flow of fuel injection control of the engine.

FIG. 9 is a flowchart showing a flow of the fuel injection control of the engine 2. In this flowchart, the control steps are indicated as S1, S2, . . . , and these steps are also merely shown as S1, S2, . . . in the following descriptions.

First, after the engine driving control is started, a basic fuel injection amount is calculated in S1, in which the intake air amount is calculated from a relation between the throttle opening degree and the crankshaft rotation speed, or from a relation between the pressure of the intake system and the crankshaft rotation speed, and a fuel injection amount corresponding to the calculated intake air amount is determined.

Next, the basic fuel amount is corrected in S2 based on inputs from various sensors such as the atmospheric pressure sensor 41, the cooling water temperature sensor 42, the throttle opening degree sensor 43, the intake air temperature sensor 44 and the exhaust passage pressure sensor 45.

Then, the fuel injection amount adaptation correction control of the present invention that will be described later is carried out in S3, and lastly, the fuel is injected to each of the cylinders #1 to #3 in S4.

In the fuel injection amount adaptation correction control carried out in S3, combustion state judging control for judging a combustion state from an increasing rate of the crankshaft rotation speed in each of the explosion stroke, and injection amount correction control for intentionally increasing or reducing the fuel injection amount to calculate a variation in the combustion state for correcting the fuel injection amount so as to enhance the combustion state are simultaneously executed.

A content of the combustion state judging control will be explained hereunder.

Figure 10:
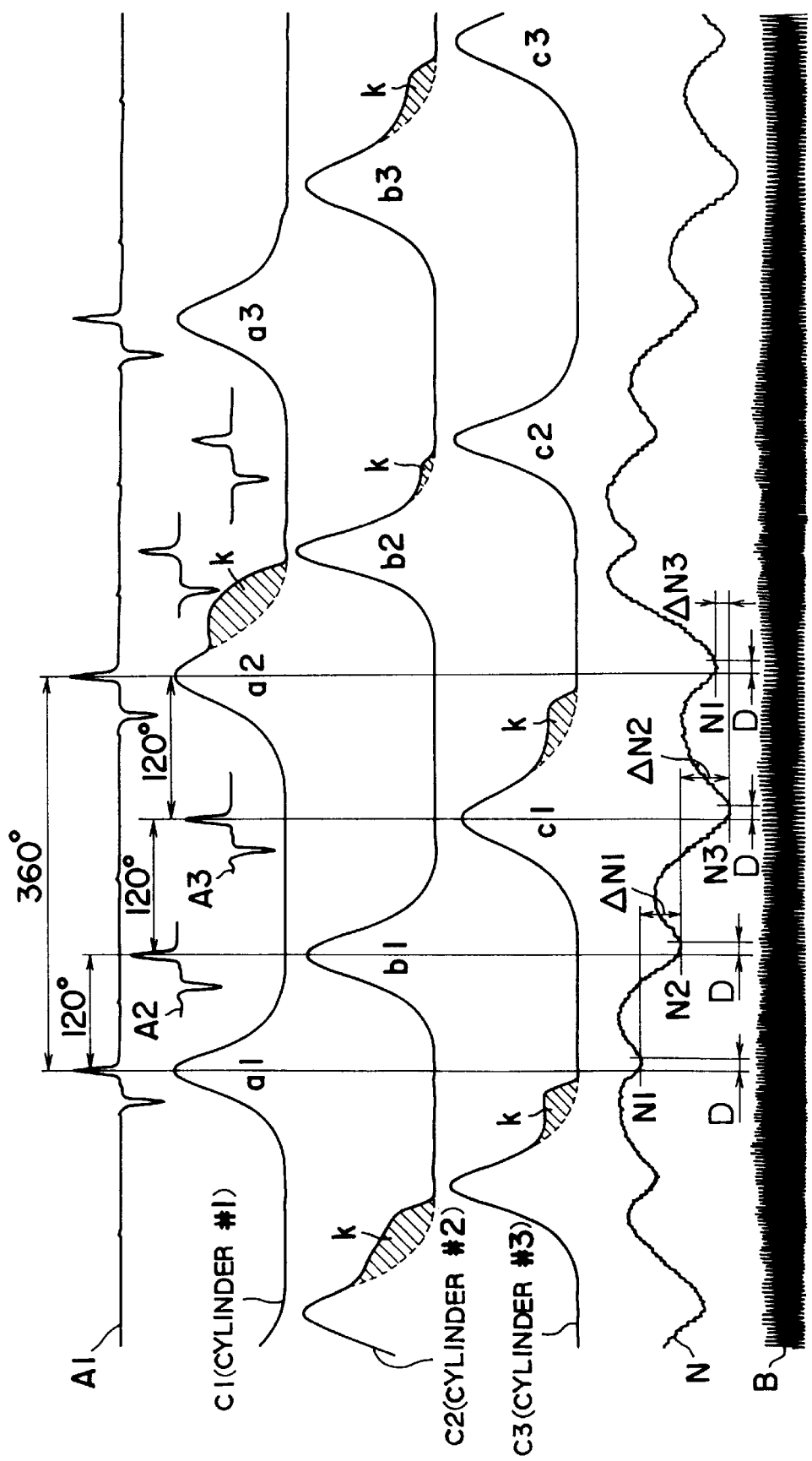
FIG. 10 is a diagram showing variation in a pressure in the cylinder of the engine, as well as crankshaft rotation speed, trigger signal and crankshaft rotation speed signal.

First, FIG. 10 shows variation of pressures C1 to C3 in the three cylinders #1 to #3 of the engine, variation of the crankshaft rotation speed N, the trigger signals A1, A2, A3 sent from the pulsar coils 36a to 36c, and the crankshaft rotation speed signal B.

Since the trigger signals A1, A2, A3 are respectively sent at the positions of the top dead centers of the cylinders #1 to #3 as described above, these signals are sequentially sent through an angle of 120°. In the present embodiment, a minus signal is once sent at a position of an angle 35° before the top dead center (BTDC) for example, and a plus signal is sent at a position of an angle 5° before the top dead center.

The crankshaft rotation speed signal B is a pulse signal sent from the crank speed sensor 39 as described above, and a value calculated by the CPU 48 of the control unit 40 based on a pulse width, the frequency and the like of this crank signal B is the crankshaft rotation speed N.

The pressures C1 to C3 of the cylinders are experimentally measured by providing pressure sensor or the like. The pressures C1 to C3 rise at the time of the compression stroke, and reach the maximum value when the piston 24 reaches the top dead center (TDC). Thereafter, when the stroke is shifted to the explosion stroke and the piston 24 is lowered, since the volume of the cylinders is increased, the pressures C1 to C3 are lowered. Depending upon the combustion state at the time of the explosion stroke, a combustion pressure portion k is generated as shown with oblique lines.

An area of this combustion pressure portion k indicates good or bad condition of the combustion state. It can be judged that if the area of the combustion pressure portion k is great, the combustion state is good and its output is high, and if the area is small, the combustion state is bad and its output is low. In the case of a two-stroke-cycle engine, there is a tendency that, during the explosion stroke, when the combustion state is good, since a large quantity of exhaust gas remains in the cylinder, the combustion condition in the next explosion stroke is prone to be bad, and during the explosion stroke when the combustion state is bad, since unburned mixture remains in the cylinder, the combustion condition in the next explosion stroke is prone to be good. Therefore, the good combustion condition and the bad combustion condition are generated substantially alternately. Thus, it happens that the area of the combustion pressure portion k is increased and reduced substantially alternately, or the combustion pressure portion k is generated or not generated.

The crankshaft rotation speed N is lowered by compression resistance whenever each of the cylinders #1 to #3 enters the compression stroke and after that, if the combustion state is good (if the area of the combustion pressure portion k is great), the crankshaft rotation speed N is again increased. In this manner, the crankshaft rotation speed N is varied while being influenced by the compression resistance at the time of the compression stroke of each of the cylinders #1 to #3 and by the combustion state (area of the combustion pressure portion k) at the time of the explosion stroke.

Here, with reference to FIG. 10, supposing that an explosion stroke of the cylinder #1 is defined as a1, subsequent explosion strokes of the cylinders #2 and #3 are defined as b1 and c1, and rotation speeds of the crankshaft 4 at predetermined angle region D in the vicinity of the tope dead centers of the explosion strokes a1, b1 and c1 are defined as N1, N2 and N3, respectively, the increasing rate $\Delta N1$ of the rotation speed N1 by the explosion stroke a1 is determined by an expression of N2-N1, the increasing rate $\Delta N2$ of the rotation speed N2 by the explosion stroke b1 is determined by an expression of N3-N2, and the increasing rate $\Delta N3$ of the rotation speed N3 by the explosion stroke c1 is determined by an expression of N1-N3 (N1 in this case is the rotation speed in the explosion stroke a2 of the cylinder #1).

In this case, the combustion pressure portion k indicating an effective combustion pressure does not appear in the combustion states of the explosion strokes a1 and b1, and the combustion state is not good and therefore, the rotation speed N2 is lower than N1, and N3 is lower than N2. Therefore, the rotation speed increasing rates $\Delta N1$ and $\Delta N2$ take minus values. On the other hand, the combustion pressure portion k indicating a slightly effective combustion pressure appears in the combustion state of the explosion stroke c1 and therefore, the rotation speed N1 is enhanced, and the rotation speed increasing rate $\Delta N3$ takes a plus value.

As described above, since the crankshaft rotation speed N is varied by the combustion state of each of the cylinders #1 to #3, the combustion state of each of the cylinders #1 to #3 can be judged by monitoring the crankshaft rotation speed N (increasing rate $\Delta Nn$) to the contrary, and the data can be accumulated (stored). If doing so, it is possible to detect the combustion states of all the cylinders without using an expensive detecting means (pressure sensor or the like) for directly measuring the pressure in the cylinder, and without providing a special detecting means for every cylinder.

The control unit 40 is programmed such that the combustion state Fn is judged by calculating the increasing rate $\Delta Nn$ of the crankshaft rotation speed Nn in each of the explosion strokes and the judged state is stored. More specifically, the crankshaft rotation speed Nn in the explosion stroke of each of the cylinders #1 to #3 is calculated based on the crankshaft rotation speed signal B, and the rotation speed increasing rate $\Delta Nn$ is calculated by comparing this crankshaft rotation speed Nn with a crankshaft rotation speed Nn+1 or Nn−1 in adjacent another explosion stroke (for example, Nn is subtracted from Nn+1 as described above).

For example, the crankshaft rotation speed in the explosion stroke a1 of the cylinder #1 is N1, and adjacent another explosion stroke is the explosion stroke b1 of the cylinder #2, and its crankshaft rotation speed is N2. A value $\Delta N1$ which is obtained by subtracting N1 from N2 is calculated as the rotation speed increasing rate by the explosion stroke a1 of the cylinder #1, and this $\Delta N1$ is stored as a combustion state Fn of the explosion stroke a1.

In the case of a multi-cylinder two-stroke-cycle engine such as the engine 2, the control unit 40 is programmed in a manner such that data of the combustion state Fn in each of the explosion strokes is corrected in accordance with combustion states Fn−1 and Fn+1 which are before and after the combustion state Fn.

For example, if the combustion state in the explosion stroke a2 of the cylinder #1 is F2, data of this F2 is corrected in accordance with a combustion state F1 in the explosion stroke c1 of the cylinder #3 which explosion is conducted after the cylinder #1, and a combustion state F3 in the explosion stroke b2 of the cylinder #2 which explosion is conducted after the cylinder #3. This is because that in the case of a multi-cylinder engine having three or more cylinders, an interval between each of the explosion strokes becomes narrow, and a variation in the crankshaft rotation speed N by the adjacent explosion strokes influences the data of the combustion state Fn.

Figure 11:
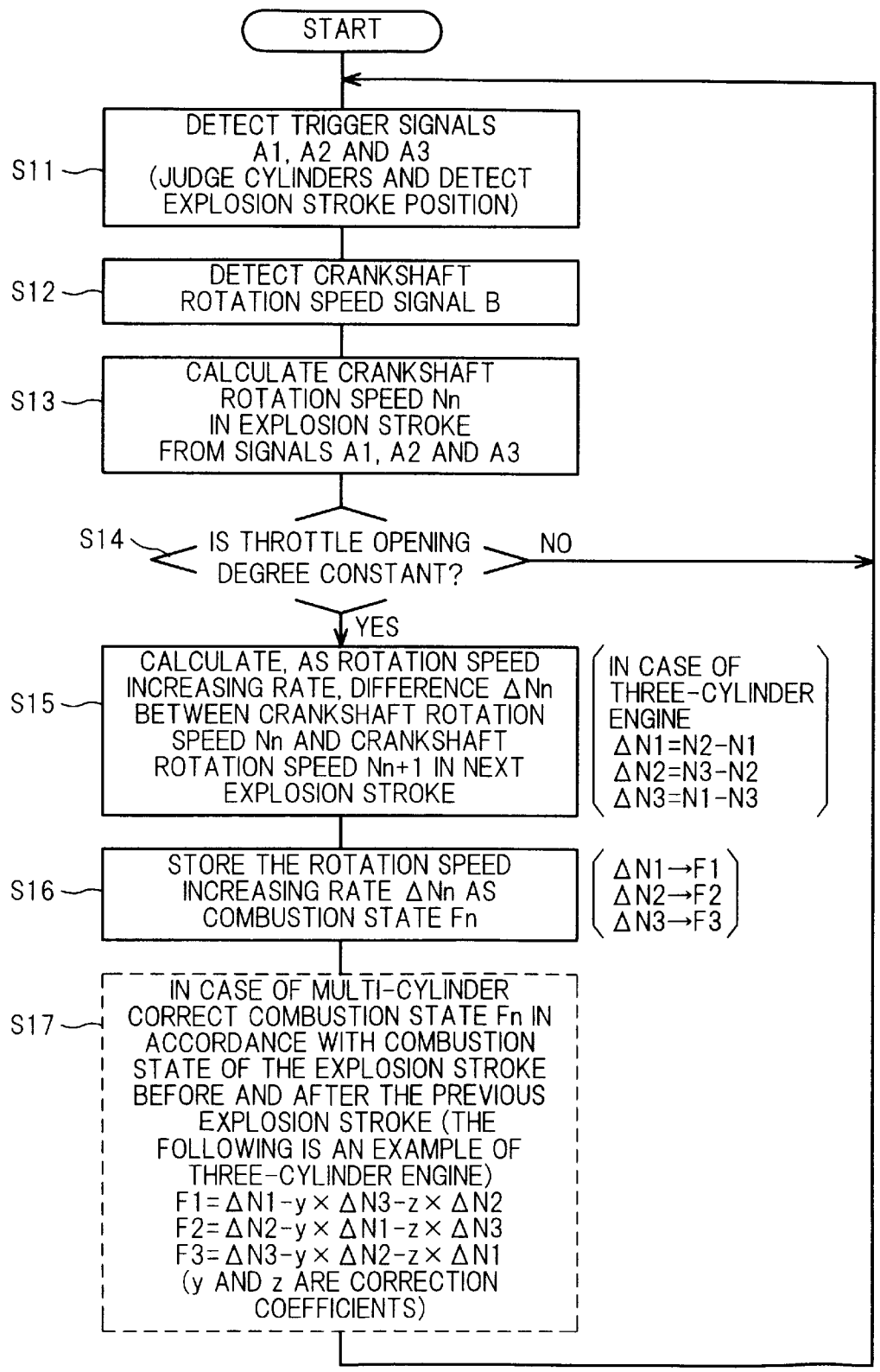
FIG. 11 is a flowchart showing a flow of combustion state judging control.

FIG. 11 is a flowchart showing a series of flow of the above-described combustion state judging control. In this flowchart, control steps are also indicated as S11, S12, . . . and these steps are merely shown as S11, S12, in the following descriptions.

First, in S11, the trigger signals A1, A2 and A3 are detected, and an explosion stroke position of each of the cylinders #1 to #3 is detected. Next, in S12, the crankshaft rotation speed signal B is detected and then, in S13, the crankshaft rotation speed Nn in each of the explosion strokes is calculated by the signals A1, A2, A3 and B. Then, in S14, it is judged whether the throttle opening degree is constant. If "NO" in S14, the procedure is returned to S1, and the routine in S11 to S14 is repeated, and if YES in S14, the procedure is advanced to S15.

In S15, a difference $\Delta Nn$ between the crankshaft rotation speed Nn and the crankshaft rotation speed Nn+1 in the next explosion stroke is calculated as the rotation speed increasing rate. In the case of the three-cylinder engine as in the present embodiment, for example, a value of the rotation speed increasing rate becomes N2-N1, a value $\Delta N2$ becomes N3-N2, and a value $\Delta N3$ becomes N1-N3 as shown in FIG. 10.

Next, the rotation speed increasing rate $\Delta Nn$ is stored as a combustion state Fn in S16 (stored in the memory circuit 51). In the case of the present embodiment, the rotation speed increasing rates $\Delta N1$, $\Delta N2$ and $\Delta N3$ are stored as F1, F2 and F3, respectively, and the procedure is again returned to S11.

In the case of the multi-cylinder engine, routine in S17 is executed after or simultaneously with S16. Then in S17, the combustion state Fn is corrected in accordance with combustion states before and after. In the case of the three-cylinder engine as in this embodiment, for example, a combustion state F1 becomes $\Delta N1$-yx $\Delta N3$-zx $\Delta N2$, a combustion state F2 becomes $\Delta N2$-yx $\Delta N1$-zx $\Delta N3$, and a combustion state F3 becomes $\Delta N3$-yx $\Delta N2$-zx $\Delta N1$. The above mentioned y and z are correction coefficients.

The combustion state of in the explosion stroke of each of the three cylinders #1 to #3 is judged and stored in this manner.

Then, a content of the injection amount correction control will be explained hereunder. This control is for intentionally increasing or reducing the fuel injection amount from the injector 23 to calculate a variation in the combustion state Fn, and for correcting the fuel injection amount so as to enhance the combustion state Fn.

Figure 12:
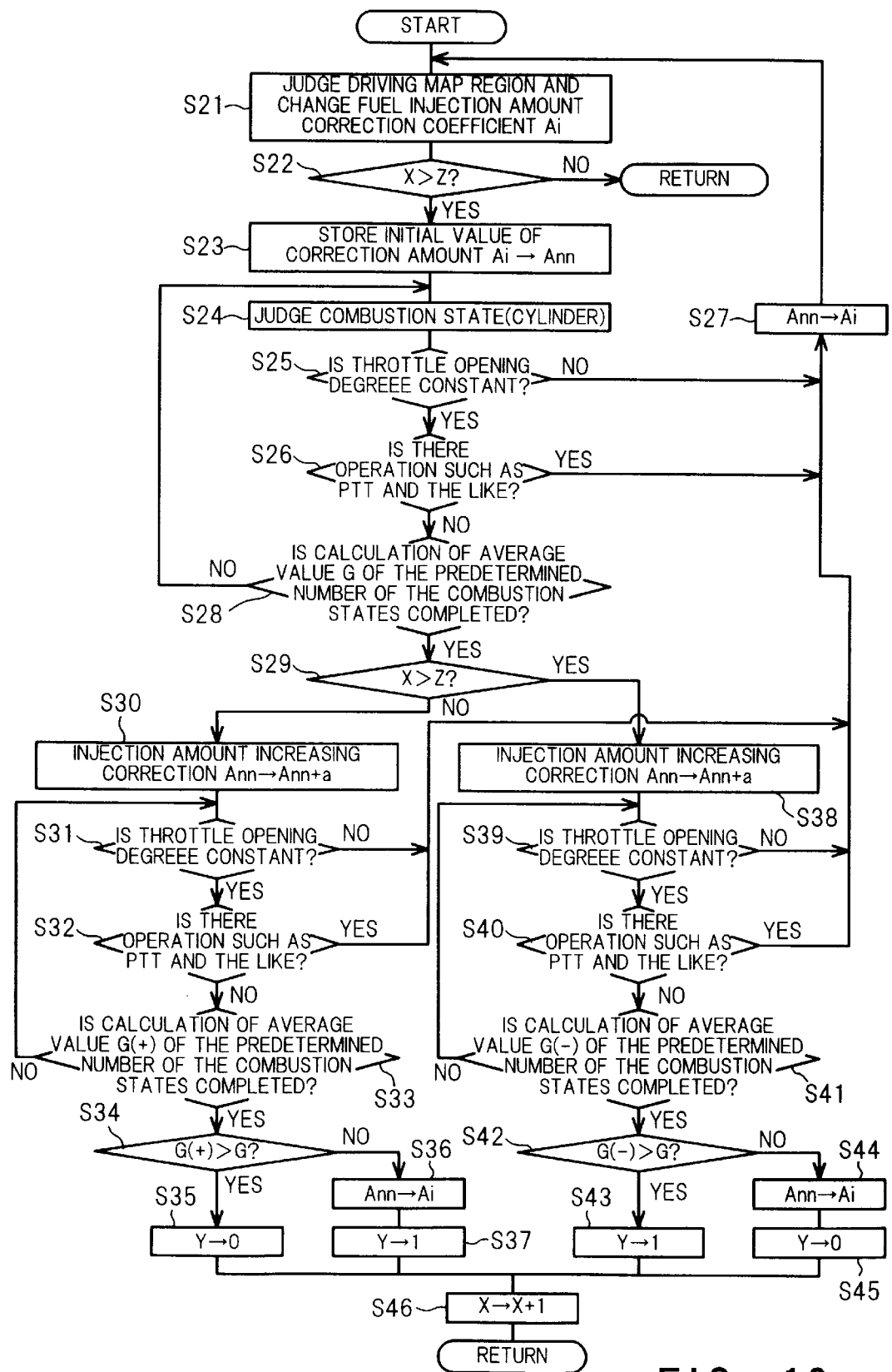
FIG. 12 is a flowchart showing injection amount correction control of an embodiment of the present invention.

A flow of this injection amount correction control is shown in a flowchart of FIG. 12. In this flowchart, control steps are indicated as S21, S22, . . . , and these steps are merely described as S21, S22, . . . hereunder.

First, the injection amount correction control is started by turning ON the fuel injection amount adaptation correction control switch 54. In S21, a driving map region is judged, and a fuel injection amount correction coefficient Ai in each of the map regions is changed or examined. Here, as shown in a table of FIG. 13, a map region in which the vehicle is currently running is judged from data such as a throttle opening degree θ (intake system pressure P) and a crankshaft rotation speed N, for example, and the fuel injection amount correction coefficient Ai in each of the map regions is intentionally changed between A11 and Ann. If the number of executions X of the injection amount correction control reaches the predetermined numbers Z, it is possible not to execute a control thereafter and to make it return (S22).

Next, an initial value of the fuel injection amount correction coefficient Ai (Ann) is stored in S23. Then, in next S24, the combustion state Fn is judged based on the combustion state judging control (flowchart in FIG. 11). The control unit is programmed such that the judgement of this combustion state Fn is executed individually for the three cylinders #1 to #3.

Next, it is judged in S25 whether the throttle opening degree is constant. If "YES", the procedure is advanced to S26 where it is judged whether there is an operation such as PTT. In these S25 and S26, in addition to the judgement whether there is an operation such as PTT, it is necessary to judge whether there is a factor (such as increase of steering angle, for example) which changes the crankshaft rotation speed N.

If "NO" in S26, i.e., if there is no factor which changes the crankshaft rotation speed N, the procedure is advanced to S28. However, if "NO" in S25, or "YES" in S26, or there is another factor which changes the crankshaft rotation speed N, the procedure is advanced to S27 where the fuel injection amount correction coefficient Ann is reset to the initial value Ai, and the procedure is returned to S21, and the routine in S21 to S26 is repeated.

If there is no factor which changes the crankshaft rotation speed N, and the procedure is advanced to S28, an average value G of the predetermined number of the combustion states Fn is calculated, and it is judged whether this calculation has been completed. The average value G of the combustion states Fn is calculated by the following equation.

$$G = [\Delta N n - (N-1) + \Delta N n - (N-2) + \ldots \Delta N n]/N$$

If the calculation of the average value G is completed (i.e. "YES" in S28), the procedure is advanced to S29, but if the calculation is not completed (i.e. "NO" in S28), the procedure is returned to S24, and the routine in S24 to S28 is repeated.

By judging whether Y is equal to the value 1 (Y=1) in S29, a tendency of increase or reduce of the injection amount correction control of the last time is judged and then discriminated as result, and depending upon the result, the tendency of increase or reduce of the injection amount correction control of the current time is determined. For example, if the last time result of the correction for increasing the injection amount is good, or if the last time result of the correction for reducing the injection amount is not good, Y=0 is stored in the memory circuit 51, and if the last time result of the correction for reducing the injection amount is good, or if the last time result of the correction for increasing the injection amount is not good, Y=1 is stored in the memory circuit 51.

Therefore, if "NO" in S29, i.e., if Y=0 is stored, since the injection amount correction of the current time is the correction for increasing the injection amount, the procedure is advanced to S30 and subsequent steps, and if "YES" in S29, i.e., if Y=1 is store, since the injection amount correction of the current time is the correction for reducing the injection amount, the procedure is advanced to S38 and subsequent steps.

If "NO" in S29 and the procedure is advanced to S30, the fuel injection amount correction coefficient Ann is increased to Ann+a, and the fuel injection amount is increased. Next, as in S25 and S26, it is judged whether there is a factor which changes the crankshaft rotation speed N. If "YES" in S31 and "NO" in S32, i.e., if there is no factor which changes the crankshaft rotation speed N, the procedure is advanced to S33. If "NO" in S31 and "YES" in S32, the procedure is moved to S27 where the fuel injection amount correction coefficient Ann is reset to the initial value Ai, and the procedure is returned to S21.

If the fuel injection amount correction coefficient Ann is set to Ann+a, and the fuel injection amount is increased in this manner, the average value G(+) of the predetermined number of combustion states Fn is calculated while keeping this state, and it is judged whether this calculation is completed. If the calculation of the average value G(+) is completed ("YES" in S33), the procedure is advanced to S34, and if the calculation is not completed ("NO" in S33), the procedure is again returned to S31, and the routine in S31 to S33 is repeated.

In S34, the average value G(+) of the combustion states Fn in which the fuel injection amount is increased is compared with an average value G of a combustion states Fn in which the fuel injection amount is not increased. If G(+) is superior to G ("YES" in S34), the fact that the result of the correction for increasing the injection amount carried in S35 was good is stored as Y→0 in the memory circuit 51. With this operation, the fuel injection amount correction coefficient Ai in the driving map region is increased.

However, if G(+) is inferior to G ("NO" in S34), the fuel injection amount correction coefficient Ann is reset to the initial value Ai in S36 and then, the fact that the result of the correction for increasing the injection amount made in S35 was not good is stored as Y→1 in the memory circuit 51. With this operation, the fuel injection amount correction coefficient Ai in the driving map region is reduced.

On the other hand, if "YES" in S29, i.e., if Y=1 is stored, this means that the result of the correction for reducing the injection amount carried out last time was good or the result of the correction for increasing the injection amount carried out last time was not good. Therefore, the injection amount correction carried out this time is correction for reducing the injection amount. Therefore, in S38, the fuel injection amount correction coefficient Ann is reduced to Ann−b, and the fuel injection amount is reduced. Next, in S39 and S40, it is judged whether there is a factor which changes the crankshaft rotation speed N as in S31 and S32 (if "YES", the procedure is moved to S27) and then, it is judged whether the calculation of an average value G(−) of the predetermined number of combustion states Fn is completed in S41. If "YES" in S41, the procedure is advanced to S42, and if "NO" in S41, the procedure is returned to 539, and routing in S39 to S41 is repeated.

In S42, the average value G(−) of the combustion states Fn in which the fuel injection amount is increased is compared with an average value G of a combustion states Fn in which the fuel injection amount is not increased. If G(−) is superior to G ("YES" in S42), the fact that the result of the correction for reducing the injection amount carried in S43 was good is stored as Y→1 in the memory circuit 51. If G(−) is inferior to G ("NO" in S42), the fuel injection amount correction coefficient Ann is reset to the initial value Ai in S44 and then, the fact that the result of the correction for reducing the injection amount carried in S42 was not good is stored as Y→0 in the memory circuit 51.

The contents stored in the memory circuit 51 in S43, S45, S35 and S37 are bases of judgement in S29. Thereafter, one time is added to the number of executions X, and the procedure is returned.

By carrying out the fuel injection amount adaptation correction control (fuel state judging control+injection amount correction control) as described above, the fuel injection amount can always be set to the optimal value, which can contribute to enhancement of the engine output and reduction in fuel consumption amount and the like.

Since the driving control apparatus 5 detects the combustion state Fn from the variation in the crankshaft rotation speed N at the time of the explosion stroke to correct the fuel injection amount, it is unnecessary to detect the actual air/fuel ratio of the mixture supplied to the engine 2, and it is unnecessary to additionally locate the air/fuel ratio detecting means such as expensive and unreliable $O_2$ sensor.

Further, the trigger pole 35, the pulsar coils 36a, 36b, and 36c for judging the cylinders and the crank speed sensor 39 for detecting the crankshaft rotation speed which are conventionally provided in the engine 2 are used as the explosion stroke position detecting means and the rotation speed detecting means as they are, and the program of the control unit 40 is only set additionally, it is unnecessary at all to add a new mechanical element to the engine 2.

Therefore, it is possible to set the fuel injection amount to the optimal value with an extremely simple and low-priced structure. Further, even in a case in which it is difficult to directly detect the air/fuel ratio due to a bad influence of the blow-through phenomenon such as in the two-stroke-cycle engine and there is a high variation in the rotation speed in the low-speed rotation region, the fuel injection amount can be controlled precisely, and a responding performance of the control is excellent. Of course, the present invention can be applied to the four-stroke-cycle engine also, and the present invention is not limited to the engine of the outboard motor or ship, but can widely be applied to an engine of a land vehicle or a general engine. In any of the cases, the present invention can largely contribute to optimization of the fuel injection amount especially at the time of constant speed driving.

Further, in this driving control apparatus 5, the control unit is programmed such that the combustion state Fn is individually judged for each of the three cylinders #1 to #3, the combustion state is correctly judged for each of the three cylinders #1 to #3 even in the multi-cylinder engine such as the engine 2, and it is possible to control the fuel injection more precisely.

As shown in S22 of the flowchart in FIG. 12, if the number of execution X of the injection amount correction control reaches the predetermined times Z, it is possible to allow the procedure to return without executing the subsequent control, but it is also possible to execute the injection amount correction control at the predetermined times and after the fuel injection amount correction coefficient Ai is determined, a rate in which the fuel injection amount can be reduced without deteriorating the combustion state Fn so much is previously measured regarding the fuel efficiency as most important, and a value obtained by taking this rate into the calculation (e.g. Anm×x/100) can be used as a correction amount.

Further, if absolute values of an increase value a in S30 and a reduction value b in S38 in the flowchart in FIG. 12 are made small as shown in the table in FIG. 14, it is possible to further enhance the precision of the fuel injection amount as the number of execution X of the inject amount correction increases.

Meanwhile, in the driving control apparatus 5, the control unit 40 is programmed such that a trouble is indicated or displayed for a cylinder which causes abnormal combustion by utilizing the combustion state judging control (see FIG. 11) and the injection amount correction control (see FIG. 12).

That is, the individual combustion state of each of the cylinders is calculated as a numerical value data Fn in the combustion state judging control, and the average value G of the predetermined number of combustion states Fn is calculated in the injection amount correction control. Therefore, when a specific cylinder does not repeat the combustion in the predetermined times or when the average value G of the combustion states Fn is smaller than a set value, or when the combustion state Fn of a specific cylinder is inferior to other cylinders, for example, at least one of the combustion state Fn and the average value G is a numerical value indicative of the abnormal combustion. Therefore, in such a case, it is judged that there is a trouble in the ignition system (the ignition device 52, ignition plug 22 and the like), the fuel system (the injector 22, the fuel pump and the like) and other portion of the corresponding cylinder, and the trouble is indicated.

For indicating the trouble, it is suggested to light (blink) a monitor lamp (LED or the like) individually indicating a trouble for each cylinder, to store the trouble mode in the memory circuit 51 to indicate the trouble using the indicating means 59 or the communication means 60, and the like. The combustion state Fn or the average value G may always be indicated.

By indicating the trouble, the user can easily judge the combustion state and the trouble state from the indicating means 59 or the communication means 60, and recognize the trouble of the engine 2 at an early state.

Especially in the case of the multi-cylinder engine, the user can hardly recognize a trouble even in one cylinder, and even if the one of the cylinders has a trouble, the engine can be operated although its condition is bad. Therefore, by indicating the trouble or allowing the user to easily recognize the trouble, it is possible to prevent the engine from being used as it is in the troubled state and prevent the damage from spreading.

Further, as the tendency of increasing the number of cylinders of an engine is increasing and the electronic control is improved, it becomes more difficult to specify a troubled portion, which takes time for repairing and requires a high level service tool or a special knowledge. However, by indicating the trouble, it becomes extremely easy to specify the trouble diagnosis, the repairing time can be shortened, and the maintenance performance is largely enhanced. Furthermore, it is possible to precisely adjust the fuel injection system individually for each cylinder, and maintenance can be carried out at low cost and easily.

Further, in this driving control apparatus 5, the control unit 40 is designed such that the various detection values concerning the combustion states Fn, the average value G thereof and the driving state (various conditions for driving) of the engine 2, and the various control values and the like by the control unit 40 are converted into frequencies, and voltage of the frequencies is applied to a meter such as a tachometer. Since indication on the meter such as the tachometer can be changed in accordance with the frequency of the applied voltage, it is possible to indicate another numerical value which is different from the original indication information and to use the meter as a display monitor, by temporarily changing this frequency to the above-described converted frequency.

In this case, the control unit 40 itself functions as the frequency conversion indicating means, and the various sensors such as the atmospheric pressure sensor 41, the cooling water temperature sensor 42, the throttle opening degree sensor 43, the intake air temperature sensor 44 and the exhaust passage pressure sensor 45 function as the driving state detecting means.

The numerical values such as various detection values (voltage) detected by the above-described various sensors, the various control values (digital values) by the control unit 40 such as the fuel injection amount, the judgement of the injection cylinder, the ignition timing, duty ratio such as various actuators, the various correction values, the fuel efficiency, the total driving time and the like are converted into the frequencies, and these frequencies are input to the meter or the like, and the numerical values are indicated.

However, since it is impossible to indicate all of the above-described various numerical values on one or a small number of meters simultaneously, an indicating mode changing switch is provided. For example, the fuel injection amount adaptation correction control switch 54 may be used, and the switch 54 is set such that the item indicated on the meter is changed. whenever the indicating mode changing switch is operated one time. That is, when a normal mode changing switch is not operated, a normal numerical value is indicated (if the meter is the tachometer, the engine revolution speed is indicated), and if the indicating mode changing switch is operated one time, the atmospheric pressure is indicated, and the cooling water temperature is indicated at the second time, and thereafter, the indicated items are changed one after another such as the throttle opening degree, the intake air temperature, and the exhaust passage pressure.

Alternatively, a plurality of indicating switches may be provided in accordance with kinds of indicating items, and the items indicated on the meter may be changed in accordance with operation of the indicating switches. In any of the cases, it is convenient to design such that a time limit is set in the indication by the switch, and the indication on the meter is returned to the normal numerical value if some tens of seconds elapses after the switch is operated.

A case in which a tachometer is used as the meter for indicating the numerical value, and some detection values or the control values are indicated on the tachometer will be explained hereunder.

First, when a temperature numerical value such as a cooling water temperature and an intake air temperature is indicated on a tachometer, a detection value detected by the cooling water temperature sensor 42 or the intake air temperature sensor 44 is converted into the actual temperature value utilizing the CPU 48 and the memory circuit 51 (a conversion table and map are stored), and when the temperature is 20° C. for example, the temperature value is converted into a frequency which indicates 2000 rpm on the tachometer, and the frequency is applied to the tachometer. When the detected temperature is 50° C., the temperature is converted into a voltage which indicates 5000 rpm, and the voltage is applied to the tachometer. With this operation, the temperature can be read from the tachometer based on the recognition that one-hundredth the numerical value indicated on the tachometer is the temperature numerical value.

As the cooling water temperature sensor 42 or the intake air temperature sensor 44, a thermistor whose voltage resistance is changed by temperature is generally used, and the temperature is obtained from the resistance value. However, since the relation between the temperature and the resistance (voltage) is nonlinear, a resistance value of the sensor is conventionally measured by a tester or the like at the time of maintenance or repair, and the measured value must be converted by a conversion table or substituted into a calculation equation to find the actual temperature, which is very troublesome. However, if the temperature value can be indicated on a meter such as a tachometer as described above, the temperature numerical value can be recognized very easily.

Similarly, when a pressure numerical value such as atmospheric pressure or exhaust passage pressure is indicated on a tachometer, if a detection pressure is 10 kPa, a voltage of the detection value is converted into frequency that indicates 1000 rpm on the tachometer and applied to the tachometer.

When a numerical value which is indicated in percentage (%) such as a throttle opening degree is to be indicated on a tachometer, if the throttle opening degree is 70% for example, a voltage of the detected value is converted into frequency that indicates 7000 rpm on the tachometer and applied to the tachometer. With this design, fully closed output adjustment can be made or trouble of the throttle opening degree sensor 43 can also be found without using a meter such as a tester as unlike in the past.

Further, to find the operational state of the injector 23 for injecting fuel, for example, although there is a method of operating each of the injector 23 individually for the cylinders for a certain time when the engine 2 is stopped and confirming the operational state by checking whether there is operational sound of the injector 23, a kind of the fuel injecting cylinder at this time may be indicated on the tachometer. In this case, 1000 rpm, 2000 rpm and 3000 rpm are indicated for the cylinders #1, #2 and #3, respectively on the tachometer.

In the case of an engine for an outboard motor or ship as the engine 2 of the present embodiment, since there is no means to indicate a mileage (traveling distance) unlike an engine for land vehicle, if a total driving time of the engine 2 is indicated on the tachometer, it is very advantageous for maintenance. In this case, the total driving time is stored in the memory circuit 51, and its numerical value is converted into frequency and applied to the tachometer. For example, the total driving time is divided every 10 hours and stored in the memory circuit 51 and the map, and if the total driving time is 50 hours, 500 rpm is indicated on the tachometer, and if the total driving time is 330 hours, 3300 rpm is indicated on the tachometer.

If the tachometer is not of analog type but digital type, figures or digits of the above-described numerical value can be correctly indicated. For example, as to the temperature, the value can be indicated in the same figure such that 20° C. can be indicated as 20, and 50° C. can be indicated as 50 on the tachometer.

As described above, since the driving control apparatus 5 converts various numerical values concerning the driving state and control state of the engine 2 into frequencies and indicates them on the meter, the driving state of the engine 2 can be indicated without providing a special indicating means, by which a structure of the driving control apparatus 5 itself can be simplified.

In the case of an engine for an outboard motor such as the engine 2, such an engine is sold separately from a ship unlike an engine for a land vehicle which is sold with a vehicle as one set, a meter which is normally mounted on the ship can be used as it is as a meter of the engine.

Therefore, although it is difficult to provide an exclusive indicating monitor on the outboard motor itself, the meter of the ship can be used as the indicating monitor as it is by converting the various numerical values concerning the driving of the engine into frequencies and indicating the frequencies on the meter of the ship, and the exclusive indicating monitor or the like is unnecessary.

In many ships, the tachometers are standardized, and the tachometer is used frequently in a ship equal to a medium-sized ship or greater and therefore, effective information can be indicated without adding special wiring or parts.

It is to be noted that the present invention is not limited to the described embodiments and many other changes and modifications may be made without departing from the scopes of the appended claims.

What is claimed is:

1. A driving control apparatus of an engine generally including a cylinder block into which a cylinder is disposed and which a crank case provided with a crankshaft, said cylinder carrying out compression, explosion, exhausting and scavenging strokes sequentially, said driving control apparatus comprising:

means for detecting a position of an explosion stroke;

means for detecting instantaneous rotation speed of the crankshaft; and a control unit which receives inputs from said explosion stroke position detecting means and said rotation speed detecting means, said control unit including means for judging a combustion state from an increasing rate of a rotation speed of the crankshaft in each explosion stroke, means for intentionally increasing or reducing an amount of fuel injection and calculating variation in said combustion state and means for correcting said amount of fuel injection so as to enhance the combustion state.

2. A driving control apparatus of an engine according to claim 1, wherein said control unit is programmed such that the judgement of said combustion state is made individually for the cylinder.

3. A driving control apparatus of an engine according to claim 1, wherein said control unit is programmed such that abnormalities of an engine operation are indicated when at least one of the judged combustion state and an average value thereof is a numerical value indicative of abnormal combustion.

4. A driving control method of an engine generally including a cylinder block into which a cylinder is disposed and a crank case provided with a crankshaft, said cylinder carrying out compression, explosion, exhausting and scavenging strokes sequentially, said driving control method comprising the steps of:

detecting a position of an explosion stroke of the cylinder;

detecting instantaneous rotation speed of the crankshaft; and performing a control process in accordance with the explosion stroke position detection and the rotation speed detection, said control process including steps of judging a combustion state from an increasing rate of a rotation speed of the crankshaft in each explosion stroke, intentionally increasing or reducing an amount of fuel injection, calculating variation in the combustion state and correcting the amount of fuel injection so as to enhance the combustion state.

\* \* \* \* \*